(12) United States Patent
Weber et al.

(10) Patent No.: US 8,889,769 B2
(45) Date of Patent: Nov. 18, 2014

(54) WEATHERING-RESISTANT POLYESTER MOLDING COMPOSITIONS WITH STYRENE COPOLYMERS

(75) Inventors: Martin Weber, Maikammer (DE); Rolf Minkwitz, Mannheim (DE); Nok-Young Choi, Ludwigshafen (DE); Peter Eibeck, Speyer (DE)

(73) Assignee: BASF SE, Ludwigshafen (DE)

( * ) Notice: Subject to any disclaimer, the term of this patent is extended or adjusted under 35 U.S.C. 154(b) by 170 days.

(21) Appl. No.: 13/533,281

(22) Filed: Jun. 26, 2012

(65) Prior Publication Data

US 2012/0329919 A1 Dec. 27, 2012

Related U.S. Application Data

(60) Provisional application No. 61/501,302, filed on Jun. 27, 2011.

(51) Int. Cl.
| | | |
|---|---|---|
| C08K 5/3435 | (2006.01) | |
| C08K 5/357 | (2006.01) | |
| C08K 5/3492 | (2006.01) | |
| C08K 3/40 | (2006.01) | |
| C08L 25/18 | (2006.01) | |
| C08L 51/00 | (2006.01) | |
| C08K 3/04 | (2006.01) | |
| C08F 265/04 | (2006.01) | |
| C08L 67/04 | (2006.01) | |
| C08K 5/34 | (2006.01) | |

(52) U.S. Cl.
CPC .............. *C08K 3/04* (2013.01); *C08K 5/3435* (2013.01); *C08K 3/40* (2013.01); *C08K 5/357* (2013.01); *C08K 5/34* (2013.01); *C08K 2201/014* (2013.01); *C08L 51/003* (2013.01); *C08F 265/04* (2013.01); *C08L 67/04* (2013.01); *C08K 5/34926* (2013.01); *C08L 25/18* (2013.01)
USPC .............. 524/97; 524/100; 524/102; 524/504

(58) Field of Classification Search
CPC .............. C08K 3/04; C08K 3/40; C08K 5/34; C08K 5/34926; C08K 5/3435; C08K 5/357; C08K 5/3492; C08K 2201/014; C08L 67/04; C08L 25/18; C08L 51/003; C08L 25/12; C08L 51/06; C08L 67/00; C08F 265/04; C08F 212/08; C08F 220/44
USPC .................... 524/97, 100, 102, 504
See application file for complete search history.

(56) References Cited

U.S. PATENT DOCUMENTS

| | | |
|---|---|---|
| 3,651,014 A | 3/1972 | Witsiepe |
| 4,141,934 A | 2/1979 | Wingler et al. |
| 4,167,543 A | 9/1979 | Liebig et al. |
| 4,224,419 A | 9/1980 | Swoboda et al. |
| 4,331,586 A | 5/1982 | Hardy |
| 4,352,904 A | 10/1982 | Deyrup |
| 4,396,769 A | 8/1983 | Ferreira et al. |
| 4,485,212 A | 11/1984 | Wefer |
| 4,492,791 A | 1/1985 | Orban et al. |
| 4,605,699 A | 8/1986 | Mitulla et al. |
| 4,634,734 A | 1/1987 | Hambrecht et al. |
| 4,902,749 A | 2/1990 | Akkapeddi et al. |
| 5,196,480 A | 3/1993 | Seitz et al. |
| 5,208,132 A | 5/1993 | Kamada et al. |
| 5,310,793 A | 5/1994 | Freitag et al. |
| 5,496,887 A | 3/1996 | Braune |
| 6,166,212 A | 12/2000 | Galbo et al. |
| 2001/0007890 A1 | 7/2001 | NieSsner et al. |
| 2003/0181583 A1 | 9/2003 | Duijzings et al. |

(Continued)

FOREIGN PATENT DOCUMENTS

| | | |
|---|---|---|
| CA | 2166330 A1 | 1/1995 |
| DE | 1260135 B | 2/1968 |

(Continued)

OTHER PUBLICATIONS

International Search Report for PCT/EP2012/061540, mailing date Sep. 19, 2012.

(Continued)

*Primary Examiner* — Kriellion Sanders
(74) *Attorney, Agent, or Firm* — Drinker Biddle & Reath LLP

(57) ABSTRACT

The invention relates to a thermoplastic molding composition containing at least one polyester, a compound of the formula (I)

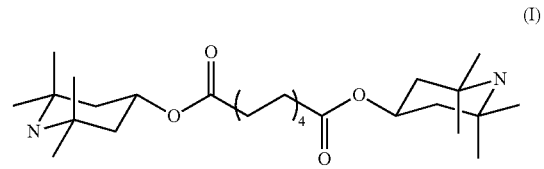

a mixture of compounds of the formula (II)

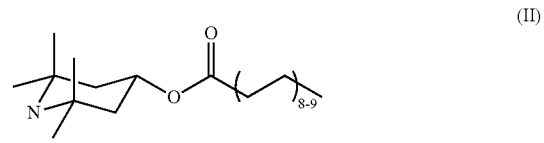

and optionally additional compounds and additives. The invention further relates to the use of the thermoplastic molding composition for the producing fibers, foils and moldings. The invention further relates to fibers, foils and moldings containing the thermoplastic molding composition.

8 Claims, No Drawings

(56) References Cited

U.S. PATENT DOCUMENTS

| | | |
|---|---|---|
| 2004/0006178 A1 | 1/2004 | Nagahara et al. |
| 2004/0087446 A1* | 5/2004 | Destro et al. .................. 504/113 |
| 2004/0180997 A1 | 9/2004 | Pearson et al. |
| 2006/0124904 A1 | 6/2006 | Gugumus |

FOREIGN PATENT DOCUMENTS

| | | |
|---|---|---|
| DE | 2540517 A1 | 3/1977 |
| DE | 28 26 925 A1 | 1/1980 |
| DE | 3149357 A1 | 6/1983 |
| DE | 3149358 A1 | 6/1983 |
| DE | 3227555 A1 | 1/1984 |
| DE | 33 36 499 A1 | 4/1985 |
| DE | 3414118 A1 | 10/1985 |
| DE | 4401055 | 7/1995 |
| DE | 10058302 A1 | 6/2001 |
| DE | 103 16 198 A1 | 10/2003 |
| EP | 0001625 A1 | 5/1979 |
| EP | 93 693 A2 | 11/1983 |
| EP | 135 677 A1 | 4/1985 |
| EP | 284 086 A2 | 9/1988 |
| EP | 534212 A1 | 3/1993 |
| EP | 573 680 A1 | 12/1993 |
| EP | 535456 | 4/1995 |
| EP | 708800 A1 | 5/1996 |
| EP | 782 994 A1 | 7/1997 |
| EP | 1363883 A1 | 11/2003 |
| GB | 1124911 A | 8/1968 |
| GB | 2387387 | 10/2003 |
| WO | WO-02/10222 A1 | 2/2002 |
| WO | WO-2010132535 A1 | 11/2010 |

OTHER PUBLICATIONS

E. Hage et al., "Impact Modification of Poly(butylene terephthalate) by ABS Materials", Polymer, vol. 38, No. 13, pp. 3237-3250, 1997.

Pei-Ching Lee et al., "In situ Compatibilization of PBT/ABS Blends Through Reactive Copolymers", Polymer, vol. 35, No. 26, pp. 5641-5650, Nov. 26, 1994.

* cited by examiner

WEATHERING-RESISTANT POLYESTER MOLDING COMPOSITIONS WITH STYRENE COPOLYMERS

CROSS-REFERENCE TO RELATED APPLICATIONS

This application claims benefit (under 35 USC 119(e)) of U.S. Provisional Application 61/501,302, filed Jun. 27, 2011, which is incorporated by reference.

The invention relates to thermoplastic molding compositions comprising

A) from 2 to 99.8% by weight of at least one polyester,
B) from 0 to 49.9% by weight of a rubber-free copolymer different from C and/or G made of
$b_1$) from 60 to 95% by weight of styrene or of substituted styrenes of the general formula Ia or a mixture of these

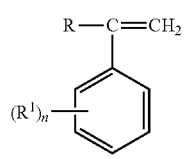

(Ia)

in which R is an alkyl radical having from 1 to 8 carbon atoms or a hydrogen atom, and $R^1$ is an alkyl radical having from 1 to 8 carbon atoms, and n has the value 1, 2, or 3, and
$b_2$) from 5 to 40% by weight of at least one unsaturated nitrile,
C) from 0 to 49.9% by weight of one or more impact-modified graft rubbers having no olefinic double bond in the rubber phase,
D) from 0.1 to 1% by weight of a compound of the formula (I)

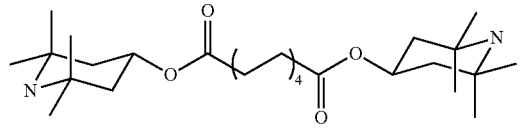

(I)

E) from 0.1 to 1% by weight of a mixture of compounds of the formula (II)

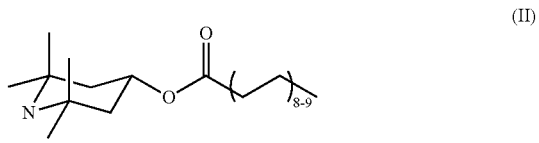

(II)

F) from 0 to 1% by weight of a mixture of compounds of the formula (III)

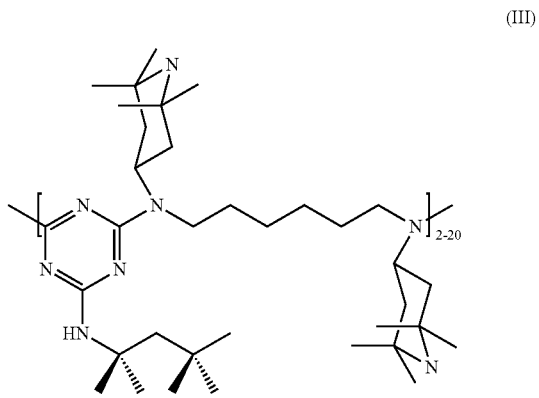

(III)

or from 0 to 1% by weight of a mixture of compounds of the formula (IV)

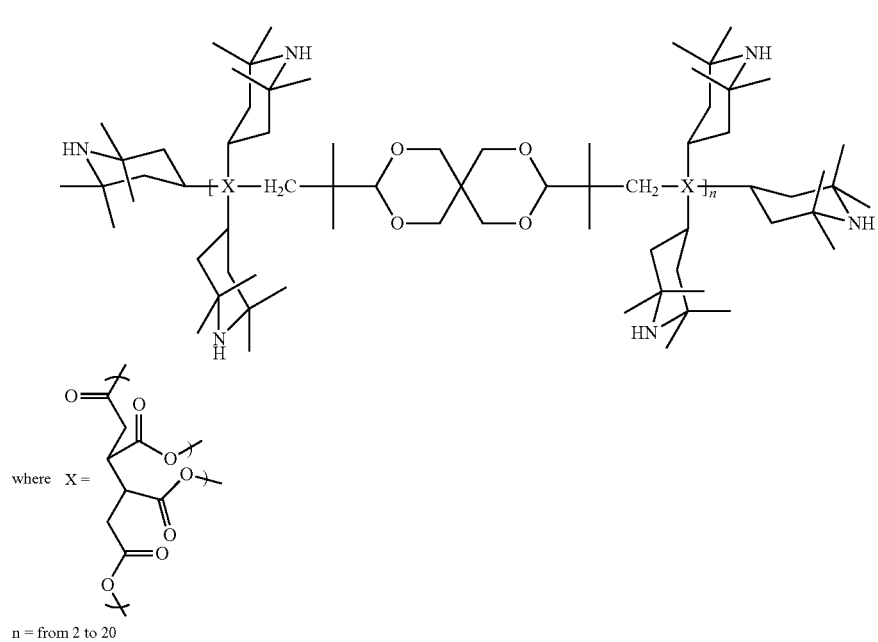

(IV)

where X = n = from 2 to 20 or from 0 to 1% by weight of a mixture of compounds of the formula (V):

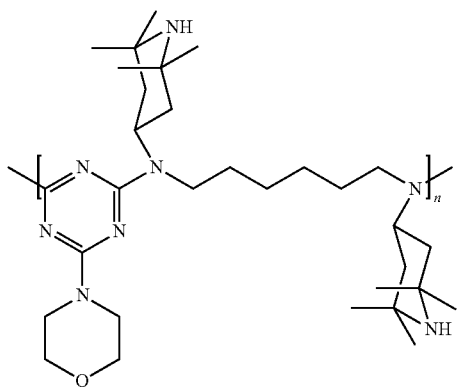

(V)

n = from 2 to 20 or from 0 to 1% by weight of a mixture of compounds of the formula (VI)

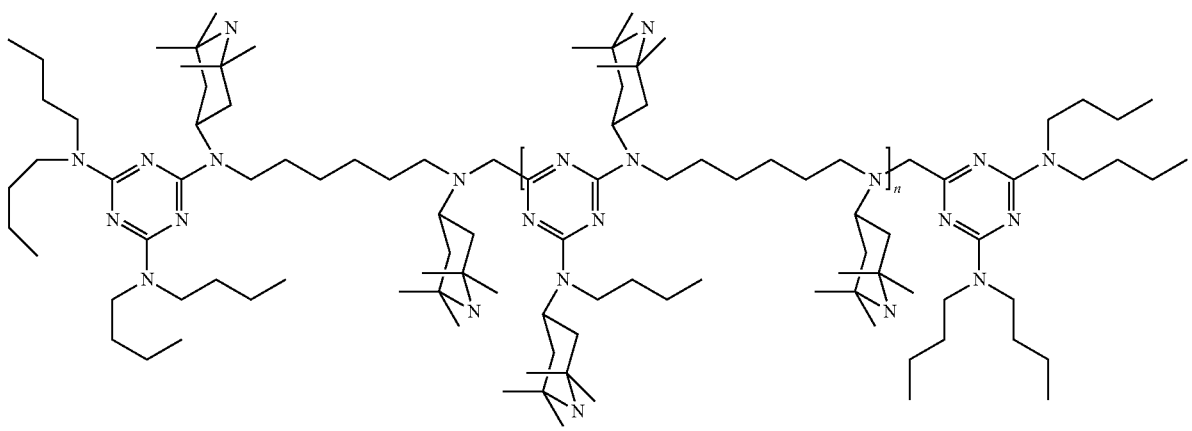

(VI)

n = from 2 to 20 or a mixture of these,

G) from 0 to 30% by weight of a copolymer made of
$g_1$) from 49.5 to 99.5% by weight of structural units deriving from one or more vinylaromatic monomers,
$g_2$) from 0 to 50% by weight of structural units deriving from one or more vinyl cyanides,
$g_3$) from 0.5 to 40% by weight of structural units deriving from one or more dicarboxylic anhydrides, and
$g_4$) from 0 to 25% by weight of structural units deriving from other copolymerizable monomers,
where each of the % by weight values for component G is based on the total weight of the structural units deriving from components $g_1$, $g_2$, $g_3$, and $g_4$, and the total of these values is 100% by weight, and H) from 0 to 60% by weight of other additives,
where the total of the percentages by weight of A) to H) gives 100%.

The invention further relates to the use of the thermoplastic molding compositions for producing fibers, foils, and moldings, and also to fibers, foils, and moldings which are obtainable from the thermoplastic molding compositions of the invention.

Polymer mixtures are of increasing interest in industry since they provide tailored combinations of properties. Of particular interest here are polymer mixtures made of incompatible polymers, where these have unusual combinations of properties. Polymer mixtures based on polyesters and on styrene copolymers have been known for some years (DE 33 36 499, U.S. Pat. No. 4,485,212, EP 135 677). However, these products have inadequate mechanical properties because of the incompatibility of polyesters with styrene copolymers.

Various approaches are therefore discussed in the literature for improving the compatibility of the phases, and materials especially used here are functionalized styrene copolymers (EP 284 086, U.S. Pat. No. 4,902,749, U.S. Pat. No. 5,310, 793, Lee P.-C., Kuo W.-F., Chang F.-C., Polymer 1994, 35, 5641) and reactive acrylate copolymers (EP 573 680, U.S. Pat. No. 4,352,904, Hage E., Hale W., Keskkula H., Paul D. R. Polymer, 1997, 38, 3237).

Stabilized molding compositions based on polyesters and on acrylate-containing molding compositions are known, a particular objective here being to comply with the increasingly stringent requirements of the automobile industry for products that are weathering-resistant. By way of example, EP 708800 describes the stabilization of molding compositions which can be composed inter alia of PBT and ASA, using a combination of sterically hindered phenol and metal oxides. EP 1363883 relates to alkoxy-bridged, sterically hindered amine stabilizers for molding compositions which can also comprise polyesters and styrene copolymers.

The stabilizer systems disclosed hitherto cannot achieve full compliance with the requirements of the automobile industry for weathering-resistant molding compositions.

It was therefore an object of the present invention to provide blends made of polyester with rubbers and optionally SAN, where these have good long-term service stability and high processing stability particularly at high mixing temperatures. A particular intention is to improve weathering resistance.

Accordingly, the molding compositions defined in the introduction have been discovered.

Preferred embodiments can be found in the subclaims.

The molding compositions of the invention comprise, as component A), from 2 to 99.8% by weight, preferably from 2 to 98.8% by weight, preferably from 20 to 97% by weight, and in particular from 40 to 85% by weight, of at least one thermoplastic polyester.

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by halogen, such as chlorine or bromine, or by $C_1$-$C_4$-alkyl, such as methyl, ethyl, iso- or n-propyl, or n-, iso- or tert-butyl.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexane-dicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 ml/g, measured in 0.5% strength by weight solution in a phenol/o-dichlorobenzene mixture (in a weight ratio of 1:1) at 25° C. in accordance with ISO 1628.

Particular preference is given to polyesters whose terminal carboxy group content is up to 100 mval/kg of polyester, preferably up to 50 mval/kg of polyester and in particular up to 40 mval/kg of polyester. Polyesters of this type may be produced, for example, by the process of DE-A 44 01 055. The terminal carboxy group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 1.0 to 35% by weight, based on 100% by weight of A).

It is also advantageous to use PET recyclates (also termed scrap PET), optionally mixed with polyalkylene terephthalates, such as PBT.

Recyclates are generally:
1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastic items which are collected and treated after utilization by the end consumer. Blow-molded PET bottles for mineral water, soft drinks and juices are easily the predominant items in terms of quantity.

Both types of recycled material may be used either in the form of regrind or in the form of pellets. In the latter case, the crude recyclates are separated and purified and then melted and pelletized using an extruder. This usually facilitates handling and free flow, and metering for further steps in processing.

The recyclates used may either be pelletized or in the form of regrind. The edge length should not be more than 10 mm, preferably less than 8 mm.

Because polyesters undergo hydrolytic cleavage during processing (due to traces of moisture) it is advisable to predry the recyclate. Residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

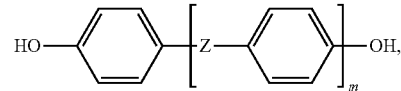

where Z is an alkylene or cycloalkylene group having up to 8 carbon atoms, an arylene group having up to 12 carbon atoms, a carbonyl group, a sulfonyl group, oxygen or sulfur, or a chemical bond, and m is from 0 to 2. The phenylene groups of the compounds may also have substitution by $C_1$-$C_6$-alkyl or alkoxy groups, and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane, 1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. HYTREL® (DuPont).

Component B) present in the invention can be from 0 to 49.9% by weight, preferably from 1 to 49.9% by weight, in particular from 2 to 20% by weight, and very particularly preferably from 2 to 15% by weight, of at least one rubber-free copolymer different from C and/or G made of $b_1$) from 60 to 95% by weight, preferably from 70 to 85% by weight, of styrene or of substituted styrenes of the general formula Ia or a mixture of these

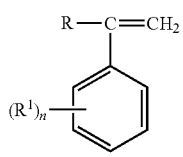

Ia in which R is an alkyl radical having from 1 to 8 carbon atoms or a hydrogen atom and $R^1$ is an alkyl radical having from 1 to 8 carbon atoms, and n has the value 1, 2, or 3, and $b_2$) from 5 to 40% by weight, preferably from 15 to 30% by weight, of at least one unsaturated nitrile.

Preferred radicals R are methyl, ethyl, and hydrogen, and preferred radicals $R^1$ are methyl, ethyl, and hydrogen.

Preferred components $b_1$) are styrene and α-methylstyrene, and mixtures of these.

Preferred components $b_2$) are acrylonitrile and methacrylonitrile, and mixtures of these.

The copolymers B) are resinous, thermoplastic, and rubber-free.

Preferred components B) are composed of $b_1$): from 50 to 90% by weight, preferably from 60 to 85% by weight, in particular from 70 to 83% by weight, of styrene and $b_2$): from 10 to 50% by weight, preferably from 15 to 40% by weight, in particular from 17 to 30% by weight, of acrylonitrile, and also $b_3$): from 0 to 5% by weight, preferably from 0 to 4% by weight, in particular from 0 to 3% by weight, of other monomers, where each of the % by weight values is based on the weight of component B and the total of these values is 100% by weight.

Components B) to which preference is further given are composed of $b_1$): from 50 to 90% by weight, preferably from 60 to 80% by weight, in particular from 65 to 78% by weight, of α-methylstyrene and $b_2$): from 10 to 50% by weight, preferably from 20 to 40% by weight, in particular from 22 to 35% by weight, of acrylonitrile, and also $b_3$): from 0 to 5% by weight, preferably from 0 to 4% by weight, in particular from 0 to 3% by weight, of other monomers, where each of the % by weight values is based on the weight of component B) and the total of these values is 100% by weight.

Equally preferred components B) are mixtures of said styrene-acrylonitrile copolymers, or α-methylstyrene-acrylonitrile copolymers with N-phenylmaleimide-styrene-acrylonitrile terpolymers.

The abovementioned other monomers used can comprise any copolymerizable monomers, for example p-methylstyrene, tert-butylstyrene, vinylnaphthalene, alkyl acrylates and/or alkyl methacrylates, for example those having $C_1$-$C_8$-alkyl radicals, N-phenylmaleimide, or a mixture of these.

The copolymers B) are known per se and can be produced via free-radical polymerization, in particular via emulsion, suspension, solution, or bulk polymerization. They have intrinsic viscosities in the range from 40 to 160 ml/g, corresponding to average molar masses Mw (weight average) of from 40 000 to 2 000 000 g/mol.

The molding compositions of the invention can comprise, as component C), from 0 to 49.9% by weight, in particular from 1 to 49.9% by weight, preferably from 1 to 40% by weight, and in particular from 5 to 20% by weight, of one or more impact-modified graft rubbers having no olefinic double bond in the rubber phase.

One method for characterizing the state of crosslinking of crosslinked polymer particles is measurement of the swelling index SI, which is a measure of the ability of a solvent to swell a polymer having some degree of crosslinking. An example of a conventional swelling agent is methyl ethyl ketone or toluene. It is preferable that the SI of the graft copolymer C of the molding compositions of the invention is in the range SI=from 6 to 60. Preference is given to an SI of from 6 to 18, particularly from 7 to 15, in toluene.

The SI is determined as follows:

An aqueous dispersion of the graft copolymer C is dried overnight at 80° C. under slight vacuum (from 600 to 800 mbar) in an atmosphere of nitrogen on a metal sheet. A section measuring 1 cm² is then cut out from the residual film of thickness about 2 mm, and is swollen overnight in 50 ml of toluene in a penicillin bottle. The supernatant toluene is removed by suction, and the swollen film is weighed and dried at 80° C. overnight. The weight of the dried film is determined. The swelling index is calculated from the quotient obtained from the weights of the swollen gel and of the dried gel.

In one preferred embodiment, the elastomeric graft copolymer C is composed of $C_1$ from 1 to 99% by weight, preferably from 55 to 80% by weight, in particular from 55 to 65% by weight, of a particulate graft base $C_1$ with glass transition temperature below 0° C., and $C_2$ from 1 to 99% by weight, preferably from 20 to 45% by weight, in particular from 35 to 45% by weight, of a graft $C_2$ with glass transition temperature above 30° C., based on C.

Component $C_1$ here is composed of $c_{11}$ from 60 to 99.9% by weight, preferably from 80 to 99.9% by weight, of at least one $C_1$-$C_8$-alkyl acrylate, preferably $C_4$-$C_8$-alkyl acrylates, in particular n-butyl acrylate and/or 2-ethylhexyl acrylate, $c_{12}$ from 0.1 to 20% by weight, preferably from 0.1 to 5% by weight, of at least one poly-functional crosslinking monomer, preferably butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, and particularly preferably diallyl phthalate, allyl methacrylate and/or dihydrodicyclopentadienyl acrylate (DCPA) and $c_{13}$ from 0 to 39.9% by weight, preferably from 0 to 19.9% by weight, of monomers that form hard polymers, e.g. vinyl acetate, (meth)acrylonitrile, styrene, substituted styrene, methyl methacrylate, or vinyl ether.

Component $C_2$ here is composed of $c_{21}$ from 40 to 100% by weight, preferably from 65 to 85% by weight, of a vinylaromatic monomer, in particular of styrene, α-methylstyrene, or N-phenylmaleimide, and $c_{22}$ from 0 to 60% by weight, preferably from 15 to 35% by weight, of a polar, copolymerizable, ethylenically unsaturated monomer, in particular of acrylonitrile, (meth)acrylate, or methacrylonitrile, or a mixture of these.

Component C is a graft copolymer comprising a graft base $C_1$ and at least one graft $C_2$. The graft copolymer C can have a relatively perfect core-shell structure (graft base $C_1$ being the core, and graft $C_2$ being the shell), but it is also possible that the graft $C_2$ only incompletely encloses or covers the graft base $C_1$, or else that there is full or partial puncture of the graft $C_2$ by the graft base $C_1$.

In one embodiment of the invention, the graft base $C_1$ can comprise what is known as a core which can be composed of a soft elastomeric polymer or of a hard polymer; in the embodiments in which the graft base $C_1$ comprises a core, the core is preferably formed from a hard polymer, in particular polystyrene, or from a styrene copolymer. These graft cores and their preparation are known to the person skilled in the art and are described by way of example in EP-A 535456 and EP-A 534212. It is, of course, also possible to use two or more graft bases $C_1$, differing from one another by way of example in their constitution or in particle size. These mixtures of different graft bases can be prepared by methods known per se to the person skilled in the art, for example by separately preparing two or more rubber latices and mixing the corresponding dispersions, separately precipitating the moist rubbers from the corresponding dispersions and, by way of example, mixing them in an extruder, or carrying out the entire work-up of the corresponding dispersions separately and then mixing the resultant graft bases.

The graft copolymer C can have one or more further grafts or graft shells between the graft base $C_1$ and the graft $C_2$—for example with other monomer constitutions—but the graft copolymer C preferably has no grafts or graft shells other than the graft $C_2$.

The glass transition temperature of the polymer of the graft base $C_1$ is usually below 0°, preferably below (−20°) C., in particular below (−30°) C. A polymer composed of the monomers forming the graft $C_2$ usually has a glass transition temperature above 30° C., in particular above 50° C. (in each case determined to DIN 53765).

The average particle size $d_{50}$ of the graft copolymers C is usually from 50 to 1200 nm, preferably from 50 to 800 nm, and particularly preferably from 50 to 600 nm. These particle sizes can be achieved by using, as graft base $C_1$, particles whose average size $d_{50}$ is from 50 to 1000 nm, preferably from 50 to 700 nm, and particularly preferably from 50 to 500 nm. According to one embodiment of the invention, the particle size distribution is monomodal. According to another inventive embodiment, the particle size distribution of component C is bimodal, the average particle size of from 60 to 90% by weight being from 50 to 200 nm and the average particle size of from 10 to 40% by weight being from 200 to 800 nm, based on the total weight of component C. The average particle size and particle size distribution stated are the variables determined from the cumulative mass distribution. These and the other average particle sizes mentioned for the purposes of the present invention are in all cases the weight-average particle sizes determined by means of HDC (W. Wohlleben and H. Schuch in Measurement of Particle Size Distribution of Polymer Latexes, 2010, editors: Luis M. Gugliotta and Jorge R. Vega, pp. 130-153).

The graft copolymers C can be produced via graft polymerization of components $C_{21}$ and $C_{22}$ onto at least one of the graft bases $C_1$ listed above. Suitable production processes for graft copolymers C are emulsion, solution, bulk, and suspension polymerization. The graft copolymers C are preferably produced via free-radical emulsion polymerization in the presence of latices of component $C_1$ at temperatures of from 20 to 90° C. with use of water-soluble or oil-soluble initiators, e.g. peroxodisulfate or benzyl peroxide, or with the aid of redox initiators. Redox initiators are also suitable for the polymerization reaction below 20° C. Suitable polymerization processes are described in WO-A-02/10222, DE-A-28 26 925, DE-A-31 49 358, and DE-C 12 60 135. The grafts are preferably constructed by the emulsion polymerization process described in DE-A-32 27 555, DE-A-31 49 357, DE-A-31 49 358, and DE-A-34 14 118. The defined adjustment of the average particle sizes to from 50 to 1200 nm is preferably achieved by the processes described in DE-C-12 60 135 and DE-A 28 26 925 or in Applied Polymer Science, volume 9 (1965), page 2929. The use of polymers with different particle sizes is disclosed by way of example in DE-A-28 26 925, and U.S. Pat. No. 5,196,480. According to the process described in DE-B-12 60 135, the graft base $C_1$ is first prepared by polymerizing the acrylate(s) $C_{11}$ used according to one embodiment of the invention and the compound $C_{12}$ acting as crosslinking agent and/or acting as grafting agent, optionally together with the other monoethylenically unsaturated monomers $C_{13}$, in aqueous emulsion in a manner known per se at temperatures of from 20 to 100° C., preferably from 50 to 90° C. Use may be made of the usual emulsifiers, such as alkali metal alkyl- or alkylarylsulfonates, alkyl sulfates, fatty alcohol sulfonates, salts of higher fatty acids having from 10 to 30 carbon atoms, or resin soaps. It is preferable to use the sodium salts of alkylsulfonates or fatty acids having from 10 to 18 carbon atoms. According to one embodiment, the amounts used of the emulsifiers are from 0.5 to 5% by weight, in particular from 0.7 to 2% by weight, based on the monomers used in preparation of the graft base $C_1$. Operations are generally carried out with a water:monomers ratio by weight of from 4:1 to 0.6:1. The polymerization initiators used are in particular the commonly used persulfates, such as potassium persulfate. However, it is also possible to use redox systems. The amounts generally used of the initiators are from 0.1 to 1% by weight, based on the monomers used in preparation of the graft base $C_1$. Other polymerization auxiliaries that can be used during the polymerization reaction are the usual buffer substances which can set a preferred pH of from 6 to 9, examples being sodium bicarbonate and sodium pyrophosphate, and also from 0 to 3% by weight of a molecular weight regulator, such as mercaptans, terpinols, or dimeric α-methylstyrene. The precise polymerization conditions, in particular the nature, feed parameters, and amount of the emulsifier, are determined individually within the ranges given above in such a way that the $d_{50}$ of the resultant latex of the crosslinked acrylate polymer $C_1$ is in the range from 50 to 1000 nm, preferably from 50 to 700 nm, particularly preferably in the range from 50 to 500 nm. The particle size distribution of the latex here is preferably to be narrow, with a polydispersity index <0.75, as in W. Mächtle and L. Börger, Analytical Ultracentrifugation of Polymers and Nanoparticles, (Springer, Berlin, 2006). ISBN 3-540-23432-2.

In a subsequent step, in order to prepare the graft polymer C, according to one embodiment of the invention, a monomer mixture composed of component $C_{21}$, preferably styrene, component $C_{22}$, preferably acrylonitrile and/or a (meth)acrylate, and optionally further unsaturated monomers can be polymerized in the presence of the resultant latex of the crosslinked acrylate polymer $C_1$. The monomers $C_{21}$, $C_{22}$ and optionally further unsaturated monomers here can be added individually or in a mixture with one another. By way of example, styrene alone can first be grafted, and then a mixture composed of styrene and acrylonitrile can be grafted. It is advantageous for this graft copolymerization reaction onto the crosslinked acrylate polymer serving as the graft base to be carried out again in aqueous emulsion under the conventional conditions described above. The system in which the graft copolymerization reaction takes place can advantageously be identical with that in which the emulsion polymerization takes place for preparation of the graft base $C_1$, and, if necessary, further emulsifier and initiator can be added here. The monomer mixture to be applied by grafting according to one embodiment of the invention can be added to the reaction mixture all at once, batchwise in two or more stages—for example to construct two or more grafts—or preferably continuously during the polymerization reaction. Conduct of the graft copolymerization reaction of the mixture of components $C_{21}$, $C_{22}$, and optionally further monomers in the presence of the crosslinking acrylate polymer $C_1$ is such as to give a degree of grafting, in the graft copolymer C, of from 10 to 70% by weight, preferably from 20 to 60% by weight, in particular from 30 to 55% by weight, based on the total weight of component C. Because the graft yield in the graft copolymerization reaction is not 100%, the amount of the monomer mixture composed of $C_{21}$, $C_{22}$ and optionally further monomers which has to be used during the graft copolymerization reaction should advantageously be somewhat greater than that corresponding to the desired degree of grafting. The control of the graft yield in the graft copolymerization reaction and therefore of the degree of grafting of the finished graft copolymer C is familiar to the person skilled in the art and can by way of example be achieved, inter alia, via the metering rate of the monomers or via addition of regulator (Chauvel, Daniel, ACS Polymer Preprints 15 (1974), page 329 to 333). The emulsion graft copolymerization reaction generally produces from 5 to 15% by weight, based on the graft copolymer, of free, non-grafted copolymer of components $C_{21}$, $C_{22}$, and optionally the further monomers. The method described in US-A-2004/0006178 can by way of example be used to determine the content of the graft copolymer C in the polymerization product obtained in the graft copolymerization reaction.

In other embodiments of the inventive processes, the graft base $C_1$ can be prepared in the presence of seed particles, and/or an agglomeration step can be carried out after preparation of the graft base $C_1$ and prior to application of the graft $C_2$. These two process options are known to the person skilled in the art and/or are described in the literature, and are selected in order, for example, to obtain specific adjustment of particle sizes and particle size distributions.

The $d_{50}$ particle size of seed particles is generally from 10 to 200 nm, preferably from 10 to 180 nm, particularly preferably from 10 to 160 nm. The particle size distribution of the seed particles used is preferably very small. Particularly preferred seed particles among these are those whose particle size distribution is monomodal. The seed particles can in principle be composed of monomers that form elastomeric polymers, for example 1,4-butadiene, or of acrylates, or of a polymer whose glass transition temperature is more than 0° C., preferably more than 25° C. Among the preferred monomers on which these seed particles are based are vinylaromatic monomers, such as styrene, ring-substituted styrenes, or α-methylstyrene, and preference among these monomers is given to styrene, acrylonitrile, alkylacrylic acid, alkyl acrylates, and among these preferably n-butyl acrylate. It is also possible to use a mixture composed of two or more, preferably two, of the monomers mentioned. Seed particles composed of polystyrene or n-butyl acrylate are very particularly preferred. Preparation of these seed particles is known to the person skilled in the art or can be carried out by methods known per se. The seed particles are preferably obtained via particle-forming heterogeneous polymerization processes, preferably via emulsion polymerization. According to the invention, the seed particles are used as initial charge, and it is possible here to begin with separate preparation and work-up of the seed particles, and then to use them. However, it is also possible to prepare the seed particles and then, without prior work-up, to add the monomer mixture composed of $C_{11}$, $C_{12}$ and optionally $C_{13}$ to the particles.

Processes for partial or complete agglomeration of the graft base $C_1$ are known to the person skilled in the art, or agglomeration can be undertaken by methods known per se to the person skilled in the art (see, for example, Keppler et al. Angew. Makromol. Chemie, 2, 1968 No. 20, pp. 1-25). There is in principle no restriction on the agglomeration method. By way of example, physical processes can be used, such as freeze agglomeration or pressure agglomeration processes. However, chemical methods can also be used to agglomerate the graft base. Among the latter are addition of electrolytes or of inorganic or organic acids. Preference is given to agglomeration undertaken by means of an agglomeration polymer. Examples of these are polyethylene oxide polymers, polyvinyl ethers, or polyvinyl alcohols. Among the suitable agglomeration polymers are moreover copolymers in which $C_1$-$C_{12}$-alkyl acrylates or $C_1$-$C_{12}$-methalkyl acrylates and polar comonomers, such as acrylamide, methacrylamide, ethacrylamide, n-butylacrylamide, maleamide, or (meth)acrylic acid are present. Among other monomers which can be present alongside these monomers in these copolymers are dienes, such as butadiene or isoprene. The agglomeration polymers can have a multistage structure and can have, for example, a core-shell structure. Examples of a core used are polyacrylates, such as polyethyl acrylate, and particles on (meth)alkyl acrylates and on the polar comonomers mentioned can be used as shell. Particularly preferred agglomeration polymer is a copolymer composed of from 92 to 99% by weight of ethyl acrylate or of ethyl methacrylate and from 1 to 8% by weight of (meth)acrylamide and/or (meth)acrylic acids. The agglomeration polymers are generally used in the form of a dispersion. The amount used of the agglomeration polymers in the agglomeration process, for every 100 parts by weight of the graft base, is generally from 0.1 to 5 parts by weight, preferably from 0.5 to 3 parts by weight.

The graft copolymers C of the invention can be used as they stand, as they are produced in the reaction mixture, for example in the form of latex emulsion or of latex dispersion. However, as an alternative, which is preferable for most applications, they can also be worked up in a further step. Methods of work-up are known to the person skilled in the art. One example of these is isolation of the graft copolymers C from the reaction mixture, e.g. via spray drying or shear, or via precipitation using strong acids, or by means of nucleating agents, such as inorganic compounds, e.g. magnesium sulfate. The graft copolymers C present in the reaction mixture can also be worked up by dewatering them completely or partially. Another possibility is to undertake the work-up by means of a combination of the methods mentioned.

The components can be mixed in any desired manner by any of the known methods. If, by way of example, these components have been produced via emulsion polymerization, the resultant polymer dispersions can be mixed with one another, and then the polymers can be precipitated together, and the polymer mixture can be worked up. However, the blending of these components preferably takes place via extrusion, kneading, or rolling of the components together, where the components have been previously isolated, if necessary, from the aqueous dispersion or solution obtained during the polymerization reaction. The graft-copolymerization products C obtained in aqueous dispersion can also be dewatered only partially and mixed in the form of moist crumb with the hard matrix, whereupon full drying of the graft copolymers C) then takes place during the mixing process.

Preferred graft polymer C) is composed of
$C_1$) from 40 to 80% by weight of a graft base made of an elastomeric polymer based on alkyl acrylates having from 1 to 8 carbon atoms in the alkyl radical and with glass transition temperature below 0° C., C₂) from 20 to 60% by weight of a graft made of
C₂₁) from 60 to 85% by weight of styrene or of substituted styrenes of the general formula Ia or a mixture of these,
C₂₂) from 15 to 35% by weight of at least one unsaturated nitrile.

A compound of the formula (I) is used as component D) of the molding compositions of the invention:

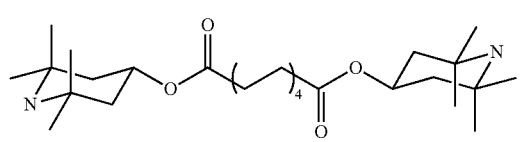
(I)

Amounts used of this are from 0.1 to 1% by weight, preferably from 0.2 to 0.9% by weight, and in particular from 0.2 to 0.7% by weight.

This sterically hindered amine (CAS number 52829-07-9) and its production are known to the person skilled in the art and are described in the literature (see by way of example US-A-4 396 769 and the references cited therein). It is available commercially from BASF SE as TINUVIN® 770.

A mixture of the compounds of the formula (II) is used as component E) of the molding compositions of the invention:

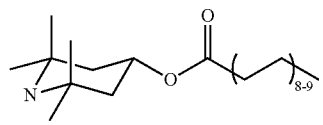
(II)

in amounts of from 0.1 to 1% by weight, preferably from 0.2 to 0.9% by weight, and in particular from 0.2 to 0.7% by weight, based on A to H.

These sterically hindered amines (CAS number 167078-06-0) and their production are known to the person skilled in the art and are described in the literature (Carlsson et al., Journal of Polymer Science; Polymer Chemistry Edition (1982), 20(2), 575-82). It is available commercially from Cytec Industries as CYASORB® 3853.

Amounts of from 0 to 1% by weight, preferably from 0.1 to 0.5% by weight, and in particular from 0.1 to 0.3% by weight, of compounds of the formula (III) to (VI), individually or in the form of a mixture, can be used as component F) of the molding compositions of the invention.

Compounds of the formula III are a mixture, where n=from 2 to 20:

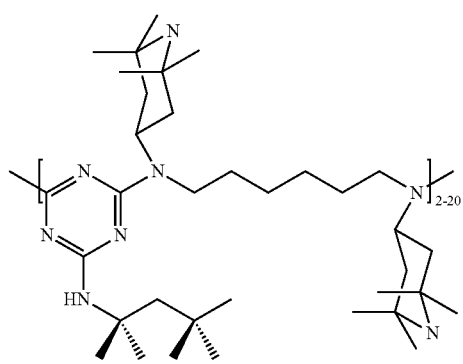
(III)

This sterically hindered amine (CAS number 71878-19-8) and its production are known to the person skilled in the art and are described in the literature (see by way of example EP-A-93 693 and the references cited therein). It is available commercially from BASF SE as CHIMASSORB® 944.

A mixture of the compounds of the formula (IV) can be used as further component F of the molding compositions of the invention:

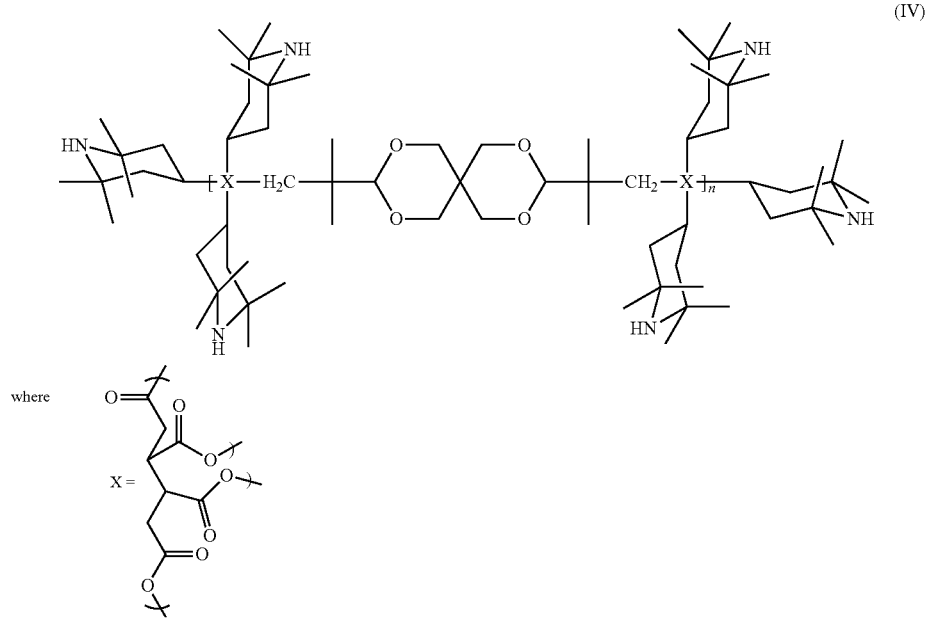
(IV)

n = from 2 to 20

This sterically hindered amine (CAS number 101357-37-3) and its production are known to the person skilled in the art and are described in the literature (see by way of example U.S. Pat. No. 5,208,132 and the references cited therein). It is available commercially from ADEKA as ADEKA STAB® LA-68.

A mixture of the compounds of the formula (V) can be used as further component F) of the molding compositions of the invention:

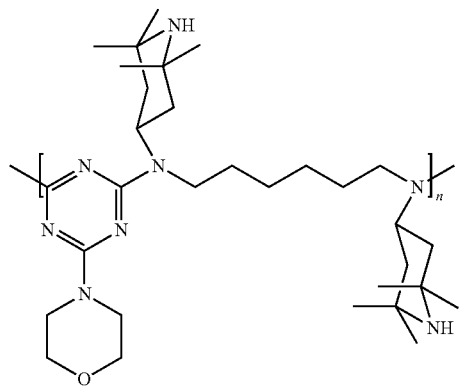

(V)

n = from 2 to 20

This sterically hindered amine (CAS number 82451-48-7) and its production are known to the person skilled in the art and are described in the literature (see by way of example U.S. Pat. No. 4,331,586 and the references cited therein). It is available commercially from Cytec Industries as CYASORB® UV-3346.

A mixture of the compounds of the formula (VI) can be used as further component F) of the molding compositions of the invention:

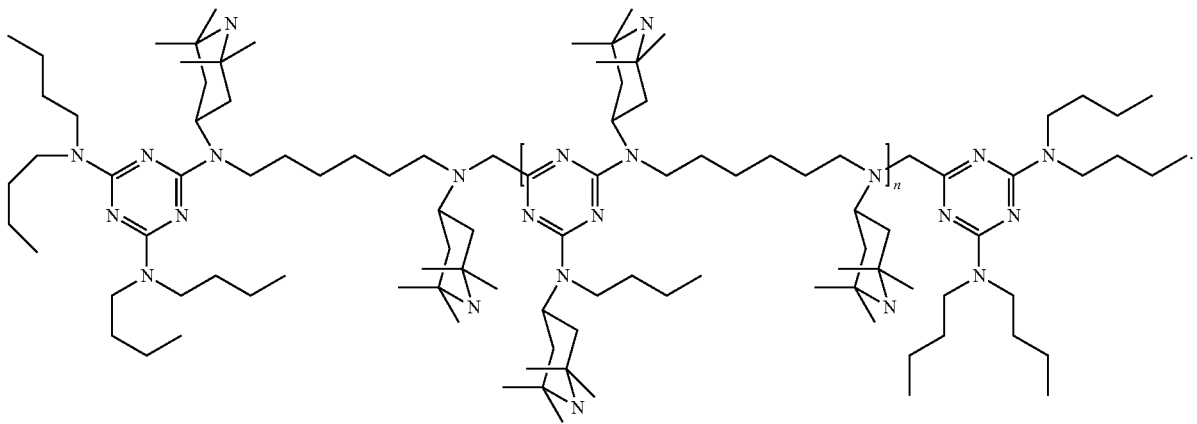

(VI)

n = from 2 to 20

This sterically hindered amine (CAS number 192268-64-7) and its production are known to the person skilled in the art and are described in the literature (see by way of example EP-A-782 994 and the references cited therein). It is available commercially from BASF SE as CHIMASSORB® 2020.

The molding compositions of the invention can comprise, as component G), from 0 to 30% by weight, preferably from 0.5 to 20% by weight, and in particular from 1 to 10% by weight (based on A to H) of a copolymer made of $g_1$) from 49.5 to 99.5% by weight, preferably from 49.5 to 93.5% by weight, of structural units deriving from one or more vinylaromatic monomers, $g_2$) from 0 to 50% by weight, preferably from 6 to 50% by weight, of structural units deriving from one or more vinyl cyanides, $g_3$) from 0.5 to 40% by weight, preferably from 0.5 to 2.4% by weight, of structural units deriving from one or more dicarboxylic anhydrides, and $g_4$) from 0 to 25% by weight of structural units deriving from other copolymerizable monomers, where each of the % by weight values is based on the total weight of the structural units deriving from components $g_1$), $g_2$), $g_3$), and $g_4$), and the total of these values is 100% by weight.

Preferred components G) comprise $g_1$) from 49.2 to 93.2% by weight
$g_2$) from 6 to 50% by weight
$g_3$) from 0.8 to 2.2% by weight
$g_4$) from 0 to 25% by weight.

Any of the vinylaromatic monomers known to the person skilled in the art and described in the prior art, for example in DE 100 58 302 A1, can be used as component $g_1$); it is preferable to use styrene, α-methylstyrene, p-methylstyrene, tert-butylstyrene, vinylnaphthalene, or a mixture of these; it is particularly preferable to use styrene.

Any of the vinyl cyanides known to the person skilled in the art and described in the prior art, for example in DE 25 40 517 A1, can be used as component $g_2$); it is preferable to use acrylonitrile, methacrylonitrile, or a mixture of these; it is particularly preferable to use acrylonitrile.

Any of the dicarboxylic anhydrides known to the person skilled in the art and described in the prior art can be used as component $g_3$); it is preferable to use maleic anhydride, methylmaleic anhydride, itaconic anhydride, or a mixture of these; it is particularly preferable to use maleic anhydride.

Component $g_4$) used in the copolymers G) of the invention can comprise other monomers which are familiar to the person skilled in the art and which can be copolymerized with components g₁), g₂), and g₃), and which differ from these.

It is particularly preferable that the copolymers G) are composed of styrene-acrylonitrile-maleic anhydride copolymers.

The copolymers G) are produced via bulk polymerization or solution polymerization, but preferably by solution polymerization in the presence of an organic solvent, such as cyclohexane, ethylbenzene, toluene, or dimethyl sulfoxide, preferably ethylbenzene.

In the case of both solution polymerization and bulk polymerization, the polymerization reaction can in principle be initiated via addition of chemical polymerization initiators, as described by way of example in DE 100 58 302 A1; however, it is preferable that the initiation is purely thermal, i.e. without any addition of a polymerization initiator. The production process can be a batch or semibatch process, but preference is given to continuous conduct of the process.

In one particularly preferred embodiment of the processes of the invention, a process is conducted continuously under steady-state conditions; the expression "under steady-state conditions" means that the concentrations of all of the reactants and the constitution of the copolymers G) formed remain practically constant over the reaction time. (Information relating to the relationship between monomer constitution and polymer constitution, and relating to the steady-state conduct of the reaction can in particular be found in EP 0 001 625 A1 and DE 25 40 517 A1.)

Suitable process parameters, such as pressure, temperature, residence times, etc., suitable apparatuses for conduct of the processes, and also suitable quantitative flow rates for the monomers, for the solvents if present, for the initiators if present, and for any other materials added to the polymerization reaction, are known to the person skilled in the art and are described in the prior art.

The methods known to the person skilled in the art and described in the prior art can be used for work-up of the polymerization mixture and for isolation of the copolymers G), an example being removal of low-molecular-weight compounds by means of application of vacuum or stripping with inert gas.

The difference between the nitrile content of preferred components G) and the nitrile content of component B) is less than 10% by weight.

The molding compositions of the invention can comprise, as component H), from 0 to 60% by weight, in particular up to 50% by weight, of other additives.

Component H) used can also comprise ethylene copolymers, ethylene-propylene copolymers, polyester elastomers, or thermoplastic polyurethanes.

These are very generally copolymers preferably composed of at least two of the following monomers: ethylene, propylene, isobutene, chloroprene, vinyl acetate, styrene, acrylonitrile, and (meth)acrylates having from 1 to 18 carbon atoms in the alcohol component.

Polymers of this type are described by way of example in Houben-Weyl, Methoden der organischen Chemie [Methods of organic chemistry], volume 14/1 (Georg-Thieme-Verlag, Stuttgart, 1961), pp. 392 to 406, and in the monograph by C. B. Bucknall, "Toughened Plastics" (Applied Science Publishers, London, 1977).

The molding compositions of the invention can comprise, as component H), from 0 to 5% by weight, preferably from 0.05 to 3% by weight, and in particular from 0.1 to 2% by weight, of at least one ester or amide of saturated or unsaturated aliphatic carboxylic acids having from 10 to 40, preferably from 16 to 22, carbon atoms with saturated aliphatic alcohols or amines having from 2 to 40, preferably from 2 to 6, carbon atoms.

The carboxylic acids may be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono-, di- or triamines. Examples of these are stearylamine, ethylenediamine, propylenediamine, hexamethylenediamine, di(6-aminohexyl)amine, particular preference being given to ethylenediamine and hexamethylenediamine. Correspondingly, preferred esters or amides are glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides, or esters with amides combined, the mixing ratio here being as desired.

Fibrous or particulate fillers H) which may be mentioned are carbon fibers, glass fibers, glass beads, amorphous silica, asbestos, calcium silicate, calcium metasilicate, magnesium carbonate, kaolin, chalk, powdered quartz, mica, barium sulfate, and feldspar, the amounts used of these being up to 60% by weight, in particular up to 50% by weight.

Preferred fibrous fillers which may be mentioned are carbon fibers, aramid fibers, and potassium titanate fibers, particular preference being given to glass fibers in the form of E glass. The forms used of these may be the commercially available forms of chopped glass or rovings.

The fibrous fillers may have been surface-pretreated with a silane compound to improve compatibility with the thermoplastics.

Suitable silane compounds are those of the general formula

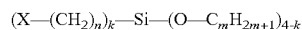

where the substituents are:

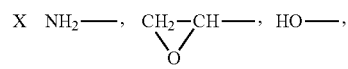

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.05 to 5% by weight, preferably from 0.5 to 1.5% by weight, and in particular from 0.8 to 1% by weight (based on H).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. Optionally, the mineral filler may have been pretreated with the abovementioned silane compounds; however, this pretreatment is not essential.

Other fillers which may be mentioned are kaolin, calcined kaolin, talc powder, and chalk. The thermoplastic molding compositions of the invention can comprise, as component H, conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers that may be mentioned, where the amounts used of these are generally up to 2% by weight, based on the molding composition, are various substituted resorcinols, salicylates, benzotriazoles, and benzophenones.

Transesterification stabilizers that may be mentioned are IRGAFOS® PEPQ, and also phosphates (e.g. monozinc phosphate).

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc powder.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

Examples of plasticizers which may be mentioned are dioctyl phthalates, dibenzyl phthalates, butyl benzyl phthalates, hydrocarbon oils and N-(n-butyl)benzenesulfonamide.

The inventive molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-containing ethylene polymers have homogeneous distribution in the molding compositions and preferably have a particle size $d_{50}$ (numeric average) in the range from 0.05 to 1 µm, in particular from 0.1 to 5 µm. These small particle sizes can particularly preferably be achieved by the use of aqueous dispersions of fluorine-containing ethylene polymers and the incorporation of these into a polyester melt.

The inventive thermoplastic molding compositions may be produced by methods known per se, by mixing the starting components in conventional mixing apparatus, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In another preferred mode of operation, the other components can be mixed with a polyester prepolymer, compounded, and pelletized. The resultant pellets are then solid-phase condensed under inert gas continuously or batchwise at a temperature below the melting point of component A) until the desired viscosity is reached.

The thermoplastic molding compositions of the invention feature good processing and good thermal stability together with good mechanical properties. In particular, there is a significant improvement in processing stability at high temperatures, and in weathering resistance.

The materials are suitable for producing fibers, foils, and moldings of any type, in particular for applications as plugs, switches, housing parts, housing covers, headlamp bezels, shower heads, fittings, smoothing irons, rotary switches, stove controls, fryer lids, door handles, (rear) mirror housings, (tailgate) screen wipers, and sheathing for optical conductors.

Electrical and electronic applications which can be produced using the polyesters of the invention are plugs, plug components, plug connectors, cable harness components, cable mounts, cable mount components, three-dimensionally injection-molded cable mounts, electrical connector elements, mechatronic components, and optoelectronic components.

Possible uses in automobile interiors are dashboards, steering column switches, seat components, headrests, center consoles, gearbox components, and door modules, and possible automobile exterior applications are door handles, headlamp components, exterior mirror components, windshield wiper components, windshield wiper protective housings, grilles, roof rails, sunroof frames, and exterior bodywork parts.

Possible uses of the polyesters in the kitchen and household sector are production of components for kitchen equipment, e.g. fryers, smoothing irons, buttons, and also garden and leisure sector applications, such as components for irrigation systems or garden equipment.

EXAMPLES

Component A

Polybutylene terephthalate with intrinsic viscosity IV 130 ml/g and with terminal carboxy content 34 meq/kg (ULTRADUR® B 4500 from BASF SE) (IV measured in 0.5% by weight solution in phenol/o-dichlorobenzene), 1:1 mixture at 25° C.

Component B

SAN having 19% by weight AN content and with intrinsic viscosity 70 ml/g (measured in DMF, 0.5% by weight solution).

Component C1

Production of fine-particle graft copolymer:
c1) 16 parts of butyl acrylate and 0.4 part of tricyclodecenyl acrylate were heated, with stirring, to 60° C. in 150 parts of water with addition of one part of the sodium salt of a $C_{12}$-$C_{18}$-paraffinsulfonic acid, 0.3 part of potassium persulfate, 0.3 part of sodium hydrogencarbonate, and 0.15 part of sodium pyrophosphate. Ten minutes after onset of the reaction, a mixture made of 82 parts of butyl acrylate and 2 parts of tricyclodecenyl acrylate was added within a period of 3 hours. The mixture was then allowed to stand for a further hour. The solids content of the resultant latex was 40% by weight. Average particle size (weight average) was determined as 76 nm. Particle size distribution was narrow (quotient Q=0.29).
c2) 150 parts of the latex obtained as in c1) were mixed with 40 parts of a mixture made of styrene and acrylonitrile (ratio by weight 75:25) and 60 parts of water, and heated, with stirring, to 65° C. over a period of 4 hours after addition of a further 0.03 part of potassium persulfate and 0.05 part of lauroyl peroxide. Calcium chloride solution was then used for precipitation at 95° C., and the product was washed with water and dried in a current of warm air. The degree of grafting of the graft copolymer was 35%.
Swelling index in toluene was: 13.6. (For measurement method, see page 10 of description.)

Component C/1 Comp

The production process was as for component C/1, but with 5 parts of tricyclodecenyl acrylate. The swelling index in toluene was: 4.9

Component D/1

A compound of the formula (I), marketed as TINUVIN® 770 by BASF SE.

D/1 Comp

A compound of the formula (VII), marketed by BASF SE as TINUVIN® 765.

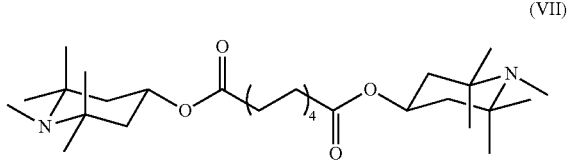

(VII)

Component E/1

A compound of the formula (II), marketed by Cytec Industries as CYASORB® 3853.

Component F

F/1

A mixture of compounds of the formula (III), marketed by BASF SE as CHIMASSORB® 944.

F/2

A mixture of compounds of the formula (V), marketed by Cytec Industries as CYASORB® UV-3346.

F/1 comp

A high-molecular-weight sterically hindered amine of the formula (VIII), CAS number 106990-42-6, marketed by SABO S.p.A. as SABOSTAB® 119.

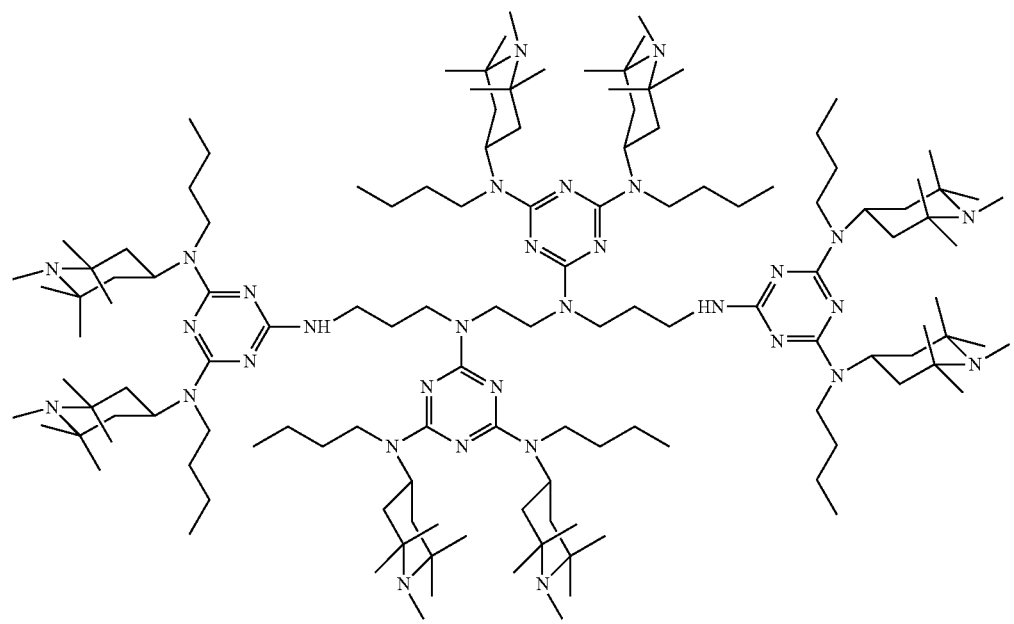

(VIII)

Component G

A styrene-acrylonitrile-maleic anhydride terpolymer was used as component G; its constitution was 74.1/23.9/2.0 (% by weight), intrinsic viscosity: 67 ml/g (measured in DMF, 0.5% by weight solution).

Component H/1

Glass fibers equipped with an epoxy size, fiber diameter 10 μm.

Component H/2

Carbon black: BLACK PEARLS® 880, marketed by Cabot Corporation.

Production and Testing of Molding Compositions

A twin-screw extruder was used to mix the components. The melt was passed through a water bath and pelletized.

Mechanical properties were also determined on specimens produced by injection molding (melt temperature: 250° C./mold temp. 60° C.).

In order to obtain a measure of weathering resistance, weathering was carried out to SAE J 1960 with a test time of 800 h on test specimens (60×60×2 mm, produced to ISO 294 in a family mold at a melt temperature of 250° C. and a mold temperature of 60° C.). The surfaces were assessed on a gray value scale (5: no alteration, 1: major alteration) after the weathering times specified in table 1; the specimens here were tested without posttreatment.

The impact resistance of the products was determined on ISO specimens to ISO 179 1 eU. Ultimate tensile strength and tensile strain at break were determined to ISO 527. In order to assess processing stability, the molding compositions were also processed at 300° C. melt temperature/60° C. mold temperature.

The constitution of the styrene copolymers used was determined via quantitative IR spectroscopy.

Table 1 lists the constitutions of the molding compositions and the test results.

The invention claimed is:

1. A thermoplastic molding composition comprising
   A) from 2 to 99.8% by weight of at least one polyester,
   B) from 0 to 49.9% by weight of a rubber-free copolymer different from C) and/or G) made of
      $b_1$) from 60 to 95% by weight of styrene or of substituted styrenes of the general formula Ia or a mixture of these

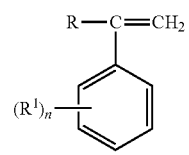

Ia in which R is an alkyl radical having from 1 to 8 carbon atoms or a hydrogen atom, and $R^1$ is an alkyl radical having from 1 to 8 carbon atoms, and n has the value 1, 2, or 3, and
      $b_2$) from 5 to 40% by weight of at least one unsaturated nitrile,
   C) from 1 to 49.9% by weight of one or more impact-modified graft rubbers having no olefinic double bond in the rubber phase, wherein said one or more graft rubbers have a swelling index from 6 to 60 (in toluene), and wherein component C) is a graft polymer composed of
      C1) from 40 to 80% by weight of a graft base made of an elastomeric polymer based on alkyl acrylates having 1 to 8 carbon atoms in the alkyl radical and with glass transition temperature below 10° C.,
      C2) from 20 to 60% by weight of a graft made of
         C21) from 60 to 85% by weight of styrene or of substituted styrenes of the general formula Ia or a mixture of these,
         C22) from 15 to 35% by weight of at least one unsaturated nitrile,

TABLE 1

| | Molding composition No. | | | | | | | |
|---|---|---|---|---|---|---|---|---|
| Components [% by wt.] | Comp 1 | 2 | 3 | 4 | 5 | comp 6 | comp 7 | comp 8 |
| A | 57.9 | 57.1 | 57.1 | 57.1 | 57.1 | 57.1 | 57.1 | 57.1 |
| B | 10.6 | 10.5 | 10.5 | 10.5 | 6.5 | 10.5 | 10.5 | 10.6 |
| C/1 | 11.0 | 10.9 | 10.9 | 10.9 | 10.9 | — | 10.9 | 11.0 |
| C/1 comp | | | | | | 10.9 | | |
| D1 | — | 0.5 | 0.5 | 0.5 | 0.5 | 0.5 | — | 0.5 |
| D/1 comp | — | — | — | — | — | — | 0.5 | — |
| E/1 | — | 0.5 | 0.25 | 0.25 | 0.5 | 0.5 | 0.5 | — |
| F/1 | — | — | 0.25 | — | — | — | — | — |
| F/2 | — | — | — | 0.25 | — | — | — | — |
| F1 comp | — | — | — | — | — | — | — | 0.3 |
| G | — | — | — | — | 4 | — | — | — |
| H/1 | 20 | 20 | 20 | 20 | 20 | 20 | 20 | 20 |
| H/2 | 0.5 | 0.5 | 0.5 | 0.5 | 0.5 | 0.5 | 0.5 | 0.5 |
| $a_n$ [kJ/m$^2$] | 54.1 | 53.5 | 53.9 | 53.7 | 62.7 | 53.5 | 53.7 | 52.4 |
| Ultimate tensile strength [N/mm$^2$] | 104 | 103 | 104 | 104 | 115 | 103 | 104 | 102 |
| Tensile strain at break [%] | 2.7 | 2.7 | 2.7 | 2.6 | 3.0 | 2.6 | 2.6 | 2.6 |
| $a_n$, processing at 300° C./60° C. [kJ/m$^2$] | 42.3 | 46.4 | 47.4 | 46.7 | 57.7 | 46.4 | 46.3 | 46.4 |
| Gray value after 800 h | 1.0 | 3.0 | 3.5 | 3.0 | 2.5 | 1.5 | 1.0 | 1.5 |

D) from 0.1 to 1% by weight of a compound of the formula (I)

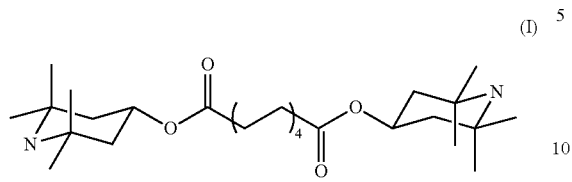

E) from 0.1 to 1% by weight of a mixture of compounds of the formula (II)

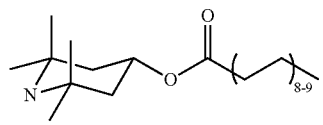

F) from 0 to 1% by weight of a mixture of compounds of the formula (III)

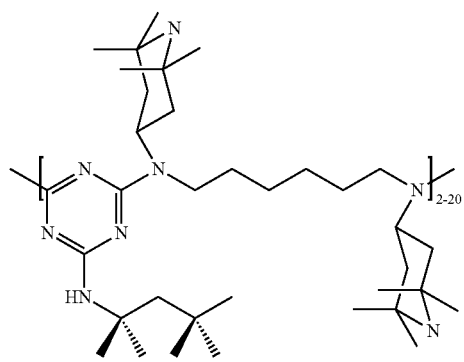

or from 0 to 1% by weight of a mixture of compounds of the formula (IV)

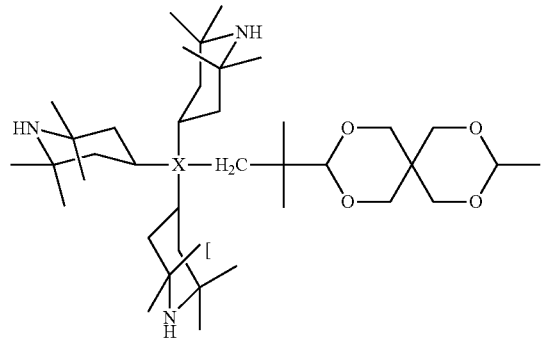

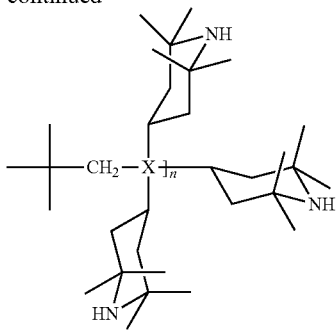

where

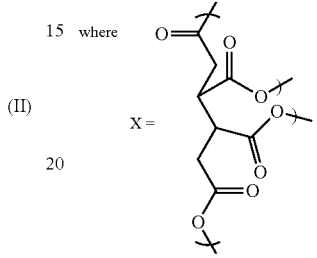

n = from 2 to 20 or from 0 to 1% by weight of a mixture of compounds of the formula (V):

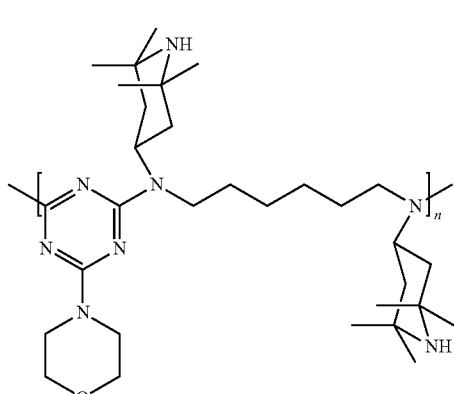

n = from 2 to 20 or from 0 to 1% by weight of a mixture of compounds of the formula (VI)

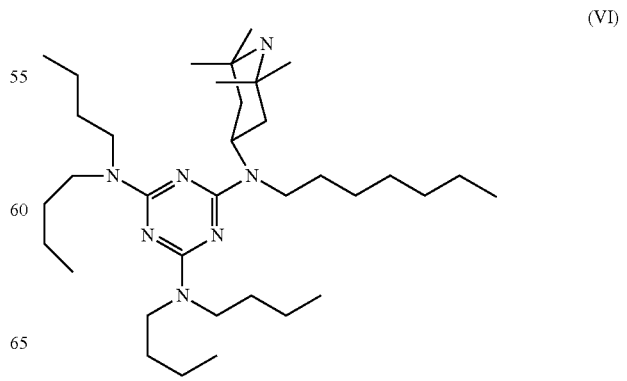

-continued

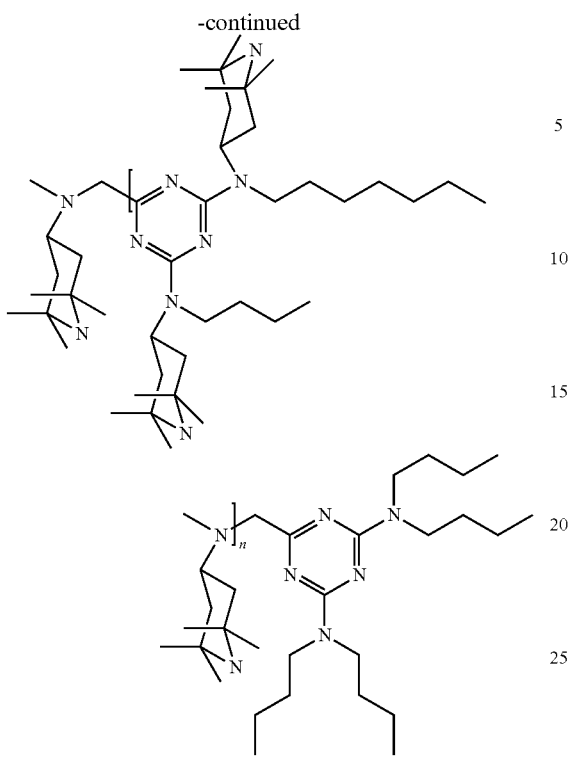

n = from 2 to 20 or a mixture of these,
G) from 0 to 30% by weight of a copolymer made of
  $g_1$) from 49.5 to 99.5% by weight of structural units deriving from one or more vinylaromatic monomers,
  $g_2$) from 0 to 50% by weight of structural units deriving from one or more vinyl cyanides,
  $g_3$) from 0.5 to 40% by weight of structural units deriving from one or more dicarboxylic anhydrides, and
  $g_4$) from 0 to 25% by weight of structural units deriving from other copolymerizable monomers,
  where each of the % by weight values for component G) is based on the total weight of the structural units deriving from components $g_1$, $g_2$, $g_3$, and $g_4$, and the total of these values is 100% by weight, and
H) from 0 to 60% by weight of other additives,
wherein the total of the percentages by weight of A) to H) do not exceed 100% by weight.

2. The thermoplastic molding composition according to claim 1, comprising
  A) from 20 to 97% by weight
  B) from 1 to 49.9% by weight
  C) from 1 to 40% by weight
  D) from 0.2 to 0.9% by weight
  E) from 0.2 to 0.9% by weight
  F) from 0 to 1% by weight
  G) from 0 to 30% by weight
  H) from 0 to 50% by weight
  where A) to H) does not exceed 100% by weight.

3. The thermoplastic molding composition according to claim 1, comprising
  A) from 20 to 97% by weight
  B) from 1 to 49.9% by weight
  C) from 1 to 40% by weight
  D) from 0.2 to 0.9% by weight
  E) from 0.2 to 0.9% by weight
  F) from 0.1 to 0.5% by weight
  G) from 0 to 30% by weight
  H) from 0 to 50% by weight
  where A) to H) does not exceed 100% by weight.

4. The thermoplastic molding composition according to claim 1, comprising
  A) from 20 to 97% by weight
  B) from 1 to 49.9% by weight
  C) from 1 to 40% by weight
  D) from 0.2 to 0.9% by weight
  E) from 0.2 to 0.9% by weight
  F) from 0.1 to 0.5% by weight
  G) from 0.5 to 20% by weight
  H) from 0 to 50% by weight
  where A) to H) does not exceed 100% by weight.

5. The thermoplastic molding composition according to claim 4, wherein component C) is a graft polymer composed of
  $C_1$) from 40 to 80% by weight of a graft base made of an elastomeric polymer based on alkyl acrylates having 1 to 8 carbon atoms in the alkyl radical and with glass transition temperature below 10° C.,
  $C_2$) from 20 to 60% by weight of a graft made of
    $C_{21}$) from 60 to 85% by weight of styrene or of substituted styrenes of the general formula Ia or a mixture of these,
    $C_{22}$) from 15 to 35% by weight of at least one unsaturated nitrile.

6. The thermoplastic molding composition according to claim 1, wherein component G) is a terpolymer made of
  component $g_1$): styrene, α-methylstyrene, p-methylstyrene, tert-butylstyrene, vinylnaphthalene, or a mixture made of two or more of these monomers,
  component $g_2$): acrylonitrile, methacrylonitrile, or a mixture of these monomers, and
  component $g_3$): maleic anhydride, methylmaleic anhydride, itaconic anhydride, or a mixture made of two or more of these monomers.

7. The thermoplastic molding composition according to claim 5, wherein component G) is a terpolymer made of
  component $g_1$): styrene, α-methylstyrene, p-methylstyrene, tert-butylstyrene, vinylnaphthalene, or a mixture made of two or more of these monomers,
  component $g_2$): acrylonitrile, methacrylonitrile, or a mixture of these monomers, and
  component $g_3$): maleic anhydride, methylmaleic anhydride, itaconic anhydride, or a mixture made of two or more of these monomers.

8. A molding, a fiber, or a foil which comprises the thermoplastic molding composition according to claim 1.

* * * * *